A. D. RAY.
APPARATUS FOR FILLING RUBBER TIRES WITH VISCOUS LIQUIDS.
APPLICATION FILED JULY 30, 1909.
944,278.
Patented Dec. 28, 1909.
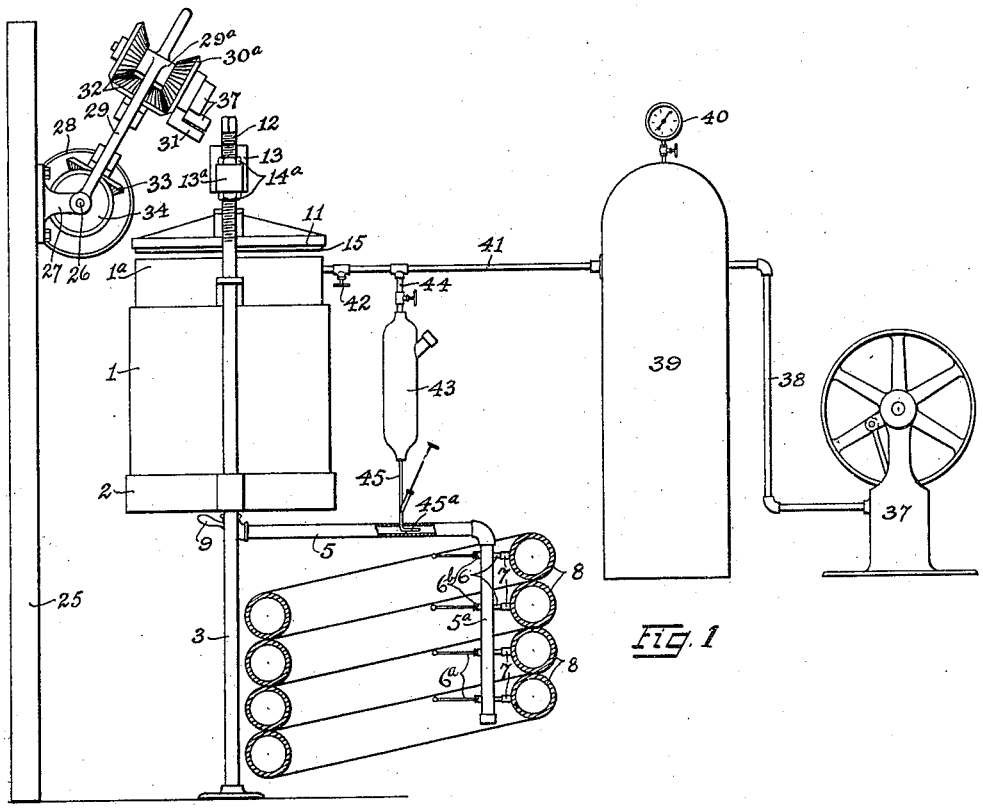
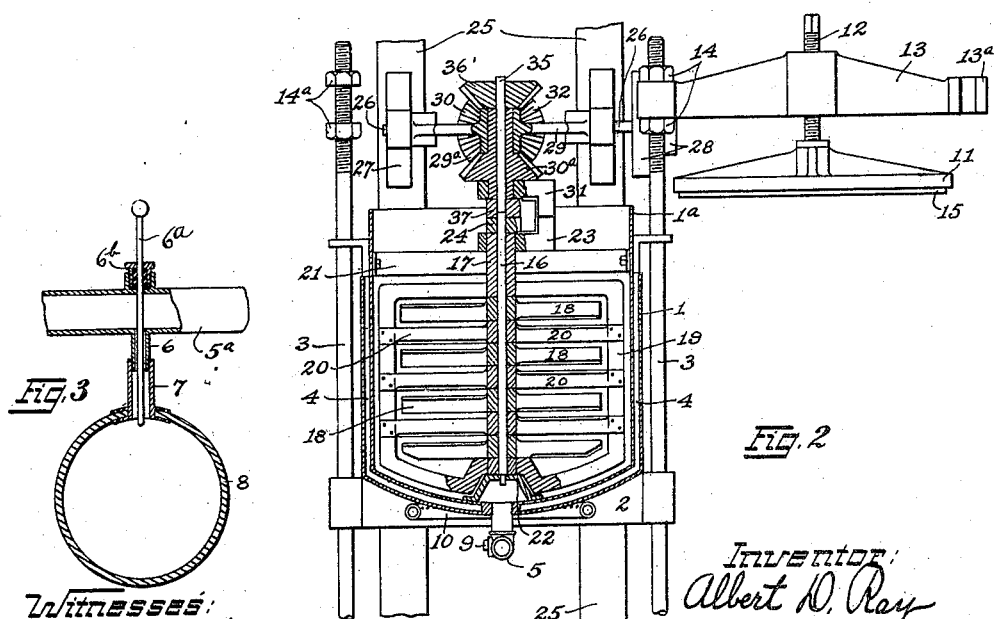

UNITED STATES PATENT OFFICE.

ALBERT D. RAY, OF CLEVELAND, OHIO, ASSIGNOR OF ONE-HALF TO C. J. CALLAHAN AND ONE-HALF TO THEODORE CHESTER, OF SUNBURY, PENNSYLVANIA.

APPARATUS FOR FILLING RUBBER TIRES WITH VISCOUS LIQUIDS.

944,278.    Specification of Letters Patent.    Patented Dec. 28, 1909.

Application filed July 30, 1909. Serial No. 510,355.

*To all whom it may concern:*

Be it known that I, ALBERT D. RAY, a citizen of the United States, residing at Cleveland, in the county of Cuyahoga and State of Ohio, have invented certain new and useful Improvements in Apparatus for Filling Rubber Tires with Viscous Liquids, of which the following is a specification.

My invention relates to apparatus for filling rubber tires with viscous liquids.

The invention relates more particularly to heating, mixing, and injecting mechanism for preparing and introducing a liquid or viscid composition into a rubber tire, said material comprising suitable ingredients suitably prepared in a main charging vessel and, when in proper condition for ejection for the purpose of filling the rubber tire, having introduced and incorporated into it a hardening agent adapted to quickly set and harden the material when it reaches and has filled the rubber tube or tire, forming a yielding or elastic body providing a resilient tread for the tire. For the purpose of properly introducing and impregnating the prepared material with this hardening or setting agent, I provide an independent auxiliary charging vessel for receiving and containing the hardening agent, said auxiliary charging vessel being in valved communication with the air inlet pipe leading to the main charging vessel and having a discharge pipe intersecting the charge outlet pipe carrying the material from the main charging vessel, said discharge pipe leading from the auxiliary charging vessel having a discharge stem or nozzle disposed at the median portion of said charge outlet pipe and extending in the direction of the flow of material therein whereby the hardening and setting agent is discharged in the middle of the flowing material and is thus thoroughly incorporated therewith.

The invention also relates to improvements in agitator mechanism for mixing and preparing the material in the main charging vessel.

With the above mentioned ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1 is a side elevation of an apparatus constructed in accordance with this invention. Fig. 2, a sectional view, with the agitator mechanism in operative position. Fig. 3, an enlarged detail view of one of the tire filling nipples of the charge outlet pipe.

Similar numerals of reference designate like parts throughout all the figures of the drawings.

The heating, mixing, and charging vessel 1, is provided with a bottom or base portion 2, and is mounted upon a pair of supporting bars or pedestals 3. The bottom and side walls of the vessel 1, are jacketed as at 4, and after the material has been prepared the material is discharged through a charge outlet pipe 5, comprising, in the present instance, a horizontally disposed portion and a vertically disposed portion $5^a$, provided with a plurality of tire filling nipples 6, adapted to be suitably inserted and connected to the nipples 7, of the inner tubes (not shown) of the tires 8. As a means of keeping the passages of the nipples 6 and 7, free of obstructions, rods $6^a$, may be mounted in packing poxes $6^b$, the rods $6^a$, being withdrawn from said passages while filling the tires as indicated in Fig. 1, of the drawings. The outlet pipe 5, is provided with a valve 9, whereby said outlet pipe may be opened or closed, as desired. The filling material within the vessel 1, is adapted to be heated by means of a gas burner 10, disposed beneath the bottom or base portion 2, of the vessel, and the latter is adapted to be opened and closed by means of a lid or cover 11, carried upon a screw 12, said screw being mounted within and carried by a cross-head or bar 13, one end of which is pivotally secured upon one of the supporting bars or pedestals by means of bearing nuts 14, and the other provided with a hooked head $13^a$, adapted to take over the opposite supporting bar or pedestal 3, between the bearing nuts $14^a$. This arrangement of the cross head or bar 13, enables the latter to be swung horizontally and outwardly away from the top of the vessel or kettle 1, carrying with it the lid or cover 11, for the reception of the driving gear mechanism for driving the agitator stirring blades as shown most clearly in Fig. 2, of the drawings. The lid or cover 11, is provided with a resilient gasket 15, adapted to take over and rest upon the upper marginal edges 1ª, of the vessel when the cover is secured down by means of the screw 12, whereby the vessel is hermetically sealed for the discharge of the tire filling material by compressed air as hereinafter described.

The agitator mechanism comprises a driving shaft 16, surrounded by a sleeve shaft 17, said driving shaft 16, carrying a plurality of stirring blades 18, and said sleeve shaft 17, carrying a blade frame 19, provided with a plurality of cross blades 20. The upper portion of the sleeve shaft 17, may be supported in a cross arm 21, in the upper portion of the vessel and the lower end of the driving shaft 16, is preferably supported in a bearing-clip 22, in the bottom portion of the vessel above the outlet opening thereof leading to the charge outlet pipe 5. The upper end of the sleeve shaft 17, is provided with a dog 23, and the upper end of the driving shaft 16, is provided with a dog 24, said dogs being adapted to be engaged and driven in opposite directions by the mechanism hereinafter described, whereby the stirring blades 18, and cross blades 20, will always be oppositely rotated, but by reason of the relative disposition and inclination of said blades the material will in the mixing operation be either worked downwardly toward the bottom of the vessel, or upwardly therefrom according to the direction in which the agitator blades are revolved.

The driving mechanism for driving the agitator may be supported on a pair of supporting beams 25, and comprises a horizontal driving shaft 26, mounted in bearing brackets 27, and preferably provided at one end with a cone-pulley 28, carrying a suitable belting communicating with a suitable source of power. A gear supporting frame 29, is pivotally mounted on the ends of the driving shaft 26, and is provided at its outer end with a bearing head 29ª, carrying a bearing-sleeve-head 30, and an integral bevel gear 30ª. The bevel gear 30ª, is provided with a dog 31, adapted to engage the dog 23, of the sleeve shaft 17, said bevel gear receiving its motion by meshing with a gear 32, carried on a driving shaft mounted in the gear supporting frame 29, said driving shaft being provided at its rear with a second gear 33, meshing with a gear 34, on the horizontal driving shaft 26. A driving shaft 35, is mounted in the bearing sleeve head 30, and is provided at its upper end with a gear 36, meshing with the gear 32. The lower end of the driving shaft 35, is provided with a dog 37, adapted to engage with the dog 24, on the driving shaft 16, and by reason of the arrangement of the gears as above described it is obvious that the stirring blades 18, on the driving shaft 16, will be revolved in an opposite direction to that of the cross blades 20, carried by the sleeve shaft 17, and the arrangement of the agitator blades and gearing as above described enables the material to be mixed as desired.

The material when properly prepared is preferably ejected or discharged from the vessel 1, by means of compressed air, the air compressing mechanism preferably comprising an ordinary air-compressor 37, provided with an outlet pipe 38, discharging into an air compression tank 39, said air compression tank being preferably provided with a gage 40, and communicating with the upper portion of the heating, mixing, and charging vessel 1, by means of an inlet pipe 41, provided with a valve 42.

The hardening and setting agent is preferably stored in a separate auxiliary charging vessel 43, provided at its upper end with a valved inlet pipe 44, intersecting said air inlet pipe 41, and provided at its lower end with a valved discharge duct or pipe 45, intersecting the charge outlet pipe 5, said discharge duct or pipe 45, terminating at its lower end in a discharge stem or nozzle 45ª, disposed at the median portion of said charge outlet pipe 5, and extending in the direction of the flow of the filling material therein, whereby the hardening and setting agent is discharged in the middle of the stream of outflowing filling material thereby thoroughly impregnating the latter with the hardening and setting agent just prior to the entrance of the filling material into the rubber tires.

From the foregoing description, taken in connection with the accompanying drawings, the operation and advantages of my invention will be readily understood.

Having thus described one of the embodiments of my invention, what I claim and desire to secure by Letters Patent is,—

1. In an apparatus for filling rubber tires, the combination with a charging vessel provided with an agitator and an air inlet pipe and a charge outlet pipe; of an auxiliary charging vessel adapted to be brought into communication with said air inlet pipe and provided with a valved discharge duct intersecting said charge outlet pipe and terminating in the median portion thereof.

2. In an apparatus for filling rubber tires, a charging vessel provided with an air inlet pipe and a charge outlet pipe, and an independent auxiliary charging vessel adapted to be thrown into and out of communication with said inlet pipe and provided with a discharge pipe intersecting said charge outlet pipe and having a discharge stem disposed at the median portion thereof and extending in the direction of the flow of filling material therein.

3. An apparatus for filling rubber tires, comprising a jacketed charging vessel, an air compression tank and inlet pipe communicating with the upper portion of said vessel, a valved outlet pipe leading from the lower portion of said vessel and terminating in a plurality of tire filling nipples, a plurality of oppositely-disposed oppositely-rotating stirring-blades mounted in said vessel, means for rotating said stirring-blades, an auxiliary charging vessel adapted to be brought into communication with said air inlet pipe independently of said main charging vessel and provided with a valved discharge-pipe terminating in a discharge stem disposed at the longitudinal center of said outlet pipe and extending in the direction of the flow of material therein.

In testimony whereof I have affixed my signature, in presence of two witnesses.

ALBERT D. RAY.

Witnesses:
O. C. BILLMAN,
GEO. H. BILLMAN.